US012531000B2

(12) United States Patent
Roh et al.

(10) Patent No.: US 12,531,000 B2
(45) Date of Patent: *Jan. 20, 2026

(54) DISPLAY APPARATUS AND METHOD OF DRIVING DISPLAY PANEL USING THE SAME

(71) Applicant: Samsung Display Co., LTD., Yongin-si (KR)

(72) Inventors: Jinyoung Roh, Hwaseong-si (KR); HongSoo Kim, Hwaseong-si (KR); Sangan Kwon, Cheonan-si (KR); Sehyuk Park, Seongnam-si (KR); Hyo Jin Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/674,165

(22) Filed: May 24, 2024

(65) Prior Publication Data

US 2024/0312381 A1 Sep. 19, 2024

Related U.S. Application Data

(63) Continuation of application No. 17/397,000, filed on Aug. 9, 2021, now Pat. No. 12,014,662, which is a (Continued)

(30) Foreign Application Priority Data

Jul. 26, 2019 (KR) ........................ 10-2019-0091075

(51) Int. Cl.

*G09G 3/20* (2006.01)

(52) U.S. Cl.

CPC ....... *G09G 3/20* (2013.01); *G09G 2310/0202* (2013.01); *G09G 2310/0267* (2013.01);

(Continued)

(58) Field of Classification Search

CPC ... G09G 2310/0202; G09G 2310/0267; G09G 2310/027; G09G 2320/0247; G09G 2320/10; G09G 2330/023; G09G 3/20

See application file for complete search history.

(56) References Cited

U.S. PATENT DOCUMENTS 9,530,380 B2 12/2016 Jang et al.
11,087,665 B2 * 8/2021 Roh ........................ G09G 3/20

(Continued)

FOREIGN PATENT DOCUMENTS

CN 101226727 A 7/2008
CN 102930839 A 2/2013

(Continued)

*Primary Examiner* — Dmitriy Bolotin

(74) *Attorney, Agent, or Firm* — CANTOR COLBURN LLP

(57) ABSTRACT

A display apparatus includes a display panel, a gate driver, a data driver and a driving controller. The display panel including a gate line and a data line displays an image based on input image data. The gate driver outputs a gate signal to the gate line. The data driver outputs a data voltage to the data line. The driving controller includes an area divider dividing the input image data into first and second area data, a first variable frequency driver determining a first driving frequency of the first area data based on a flicker value according to a grayscale value and generating a first data signal of the first driving frequency and a second variable frequency driver determining a second driving frequency of the second area data based on a flicker value according to a grayscale value and generating a second data signal of the second driving frequency.

14 Claims, 13 Drawing Sheets

Related U.S. Application Data continuation of application No. 16/923,355, filed on Jul. 8, 2020, now Pat. No. 11,087,665.

(52) U.S. Cl.
CPC ................. *G09G 2310/027* (2013.01); *G09G 2320/0247* (2013.01); *G09G 2320/10* (2013.01); *G09G 2330/023* (2013.01)

(56) References Cited

U.S. PATENT DOCUMENTS

| | | | | |
|---|---|---|---|---|
| 12,014,662 | B2 * | 6/2024 | Roh | G09G 3/20 |
| 2007/0296668 | A1 * | 12/2007 | Kim | G09G 3/3611 345/89 |
| 2009/0284499 | A1 * | 11/2009 | Kim | G09G 3/20 345/204 |
| 2012/0229211 | A1 * | 9/2012 | Konecny | H03F 3/2173 327/109 |
| 2013/0038639 | A1 | 2/2013 | Han et al. | |
| 2014/0085276 | A1 | 3/2014 | Jang et al. | |
| 2015/0145900 | A1 | 5/2015 | Lee et al. | |
| 2015/0228216 | A1 | 8/2015 | Lee et al. | |
| 2015/0340014 | A1 * | 11/2015 | Kim | G06T 1/20 345/212 |
| 2016/0093239 | A1 * | 3/2016 | Wang | G06F 1/32 345/55 |
| 2016/0111055 | A1 * | 4/2016 | Na | G09G 3/3666 345/94 |
| 2017/0018234 | A1 * | 1/2017 | Na | G09G 3/3406 |
| 2017/0092191 | A1 * | 3/2017 | An | G09G 3/3233 |
| 2017/0092198 | A1 | 3/2017 | Ryu et al. | |
| 2017/0309237 | A1 | 10/2017 | Lee et al. | |
| 2017/0330503 | A1 * | 11/2017 | Yang | G09G 3/2092 |
| 2018/0102096 | A1 | 4/2018 | Lee et al. | |
| 2020/0349879 | A1 * | 11/2020 | Park | G09G 3/3233 |
| 2020/0349893 | A1 * | 11/2020 | Lee | G09G 3/3233 |
| 2020/0350389 | A1 * | 11/2020 | Lee | G06F 3/041 |
| 2021/0020107 | A1 * | 1/2021 | Park | G09G 3/3258 |
| 2021/0027686 | A1 * | 1/2021 | Roh | G09G 3/20 |
| 2021/0027715 | A1 * | 1/2021 | Kim | G09G 3/20 |
| 2021/0043143 | A1 * | 2/2021 | Kim | G09G 3/3291 |
| 2021/0049949 | A1 * | 2/2021 | Lee | G09G 3/2074 |
| 2021/0056885 | A1 * | 2/2021 | Park | G09G 3/3291 |

FOREIGN PATENT DOCUMENTS

| | | | |
|---|---|---|---|
| CN | 103680382 | A | 3/2014 |
| CN | 104658491 | A | 5/2015 |
| CN | 104835457 | A | 8/2015 |
| KR | 1020080100647 | A | 11/2008 |
| KR | 1020150044702 | A | 4/2015 |
| KR | 1020150059385 | A | 6/2015 |
| KR | 1020160045215 | A | 4/2016 |
| KR | 1020190040712 | A | 4/2019 |

* cited by examiner

FIG. 6

| STAGE | INPUT GRAYSCALE VALUE(8bit) | FLICKER VALUE | FREQUENCY(Hz) |
|---|---|---|---|
| 1 | 0-3 | 0 | 1 |
| 2 | 4-7 | 0 | 1 |
| 3 | 8-11 | 40 | 2 |
| 4 | 12-15 | 80 | 5 |
| 5 | 16-19 | 120 | 10 |
| 6 | 20-23 | 160 | 30 |
| 7 | 24-27 | 200 | 60 |
| ⋮ | ⋮ | ⋮ | ⋮ |
| 60 | 236-239 | 0 | 1 |
| 61 | 240-243 | 0 | 1 |
| 62 | 244-247 | 0 | 1 |
| 63 | 248-251 | 0 | 1 |
| 64 | 252-255 | 0 | 1 |

DISPLAY APPARATUS AND METHOD OF DRIVING DISPLAY PANEL USING THE SAME

This application is a continuation of U.S. patent application Ser. No. 17/397,000, filed on Aug. 9, 2021, which is a continuation of U.S. patent application Ser. No. 16/923,355, filed on Jul. 8, 2020, which claims priority to Korean Patent Application No. 10-2019-0091075, filed on Jul. 26, 2019, and all the benefits accruing therefrom under 35 U.S.C. § 119, the content of which in its entirety is herein incorporated by reference.

BACKGROUND

1. Field

Exemplary embodiments of the invention relate to a display apparatus and a method of driving a display panel using the display apparatus. More particularly, exemplary embodiments of the invention relate to a display apparatus reducing a power consumption and enhancing a display quality and a method of driving a display panel using the display apparatus.

2. Description of the Related Art

A method to minimize a power consumption of an information technology ("IT") product such as a tablet personal computer ("PC") and a notebook PC have been studied.

To minimize the power consumption of the IT product which includes a display panel, a power consumption of the display panel may be minimized. When the display panel displays a still image, the display panel may be driven in a relatively low frequency so that the power consumption of the display panel may be reduced.

SUMMARY

When a portion of a display panel displays a video image and another portion of a display panel displays a still image, the display panel may be driven by a relatively high frequency so that the power consumption of the display panel may not be effectively reduced.

In addition, when the display panel is driven in the relatively low frequency, a flicker may be generated so that a display quality may decrease.

Exemplary embodiments of the invention provide a display apparatus capable of reducing a power consumption and enhancing a display quality.

Exemplary embodiments of the invention also provide a method of driving a display panel using the display apparatus.

In an exemplary embodiment of a display apparatus according to the invention, the display apparatus includes a display panel, a gate driver, a data driver and a driving controller. The display panel includes a gate line and a data line. The display panel displays an image based on input image data. The gate driver outputs a gate signal to the gate line. The data driver outputs a data voltage to the data line. The driving controller includes an area divider which divides the input image data into first area data and second area data, a first variable frequency driver which determines a first driving frequency of the first area data based on a flicker value according to a grayscale value of the first area data and generates a first data signal of the first driving frequency when the first area data represents a still image and a second variable frequency driver which determines a second driving frequency of the second area data based on a flicker value according to a grayscale value of the second area data and generates a second data signal of the second driving frequency when the second area data represents a still image.

In an exemplary embodiment, the first variable frequency driver may include a first still image determiner which determines whether the first area data represent the still image or a video image, and which generates a first flag representing whether the first area data represent the still image or the video image, a first flicker value storage which stores the flicker value according to the grayscale value of the first area data, a first driving frequency determiner which determines a driving mode of the first area data among one of a normal driving mode and a low frequency driving mode based on the first flag and which determines the first driving frequency of the first area data using the first flicker value storage and a first compensation frame inserter which inserts a first compensation frame between a frame of a first frequency and a frame of a second frequency when the first driving frequency is changed from the first frequency to the second frequency by the first driving frequency determiner.

In an exemplary embodiment, the first area data may include a plurality of segments. The first variable frequency driver may determine the first driving frequency of the first area data based on optimal driving frequencies for the plurality of segments of the first area data.

In an exemplary embodiment, the second variable frequency driver may include a second still image determiner which determines whether the second area data represent a still image or a video image, and which generates a second flag representing whether the second area data represent the still image or the video image, a second flicker value storage which stores the flicker value according to the grayscale value of the second area data, a second driving frequency determiner which determines a driving mode of the second area data among one of the normal driving mode and the low frequency driving mode based on the second flag and which determines the second driving frequency of the second area data using the second flicker value storage and a second compensation frame inserter which inserts a second compensation frame between a frame of a third frequency and a frame of a fourth frequency when the second driving frequency is changed from the third frequency to the fourth frequency by the second driving frequency determiner.

In an exemplary embodiment, the second area data may include a plurality of segments. The second variable frequency driver may determine the second driving frequency of the second area data based on optimal driving frequencies for the plurality of segments of the second area data.

In an exemplary embodiment, the first flicker value storage may be same as the second flicker value storage.

In an exemplary embodiment, the area divider may divide an input data enable signal corresponding to the input image data into a first data enable signal corresponding to the first area data and a second data enable signal corresponding to the second area data and generate the first data enable signal and the second data enable signal. The first variable frequency driver may generate the first data signal having the first driving frequency using the first data enable signal. The second variable frequency driver may generate the second data signal having the second driving frequency using the second data enable signal. The driving controller may generate an integrated data signal by an OR operation of the first data signal and the second data signal.

In an exemplary embodiment, the gate driver may output a first gate signal group corresponding to the first area data and a second gate signal group corresponding to the second area data. The gate driver may inactivate an output of at least one of the first gate signal group and the second gate signal group based on the first driving frequency and the second driving frequency.

In an exemplary embodiment, the area divider may divide the input image data into the first area data, the second area data and third area data. The driving controller may further include a third variable frequency driver which determines a third driving frequency of the third area data based on a flicker value according to a grayscale value of the third area data.

In an exemplary embodiment of a display apparatus according to the invention, the display apparatus includes a display panel, a gate driver, a data driver and a driving controller. The display panel includes a gate line and a data line. The display panel displays an image based on input image data. The gate driver outputs a gate signal to the gate line. The data driver outputs a data voltage to the data line. The driving controller includes an area divider which divides the input image data into first area data and second area data, a first variable frequency driver which determines a first driving frequency of the first area data based on a flicker value according to a grayscale value of the first area data when the first area data represents a still image, a second variable frequency driver which determines a second driving frequency of the second area data based on a flicker value according to a grayscale value of the second area data when the second area data represents a still image and a compensation frame inserter which inserts a compensation frame into the first area data and the second area data when at least one of the first driving frequency and the second driving frequency is changed.

In an exemplary embodiment, the first variable frequency driver may include a first still image determiner which determines whether the first area data represent a still image or a video image, and which generates a first flag representing whether the first area data represent the still image or the video image, a first flicker value storage which stores the flicker value according to the grayscale value of the first area data and a first driving frequency determiner which determines a driving mode of the first area data among one of a normal driving mode and a low frequency driving mode based on the first flag and which determines the first driving frequency of the first area data using the first flicker value storage.

In an exemplary embodiment, the second variable frequency driver may include a second still image determiner which determines whether the second area data represent a still image or a video image, and which generates a second flag representing whether the second area data represent the still image or the video image, a second flicker value storage which stores the flicker value according to the grayscale value of the second area data and a second driving frequency determiner which determines a driving mode of the second area data among one of the normal driving mode and the low frequency driving mode based on the second flag and which determines the second driving frequency of the second area data using the second flicker value storage.

In an exemplary embodiment, the first flicker value storage may be same as the second flicker value storage.

In an exemplary embodiment, when the first driving frequency is changed from a first frequency to a second frequency by the first variable frequency driver and the second driving frequency is changed from a third frequency to a fourth frequency by the second variable frequency driver, the compensation frame inserter may determine a frequency of the compensation frame and a number of the compensation frames based on a maximum value among a difference between the first frequency and the second frequency, a difference between the first frequency and the fourth frequency, a difference between the third frequency and the second frequency and a difference between the third frequency and the fourth frequency.

In an exemplary embodiment of a method of driving a display panel, the method includes dividing input image data into first area data and second area data, determining a first driving frequency of the first area data based on a flicker value according to a grayscale value of the first area data and generating a first data signal of the first driving frequency when the first area data represents a still image, determining a second driving frequency of the second area data based on a flicker value according to a grayscale value of the second area data and generating a second data signal of the second driving frequency when the second area data represents a still image, outputting a gate signal to a gate line of the display panel based on the first driving frequency and the second driving frequency and outputting a data voltage to a data line of the display panel based on the first driving frequency and the second driving frequency.

In an exemplary embodiment, the generating the first data signal may include determining whether the first area data represent a still image or a video image, and generating a first flag representing whether the first area data represent the still image or the video image, determining a driving mode of the first area data among one of a normal driving mode and a low frequency driving mode based on the first flag and determining the first driving frequency of the first area data using a first flicker value storage which stores the flicker value according to the grayscale value of the first area data and inserting a first compensation frame between a frame of a first frequency and a frame of a second frequency when the first driving frequency is changed from the first frequency to the second frequency.

In an exemplary embodiment, the generating the second data signal may include determining whether the second area data represent a still image or a video image, and generating a second flag representing whether the second area data represent the still image or the video image, determining a driving mode of the second area data among one of the normal driving mode and the low frequency driving mode based on the second flag and determining the second driving frequency of the second area data using a second flicker value storage which stores the flicker value according to the grayscale value of the second area data and inserting a second compensation frame between a frame of a third frequency and a frame of a fourth frequency when the second driving frequency is changed from the third frequency to the fourth frequency.

In an exemplary embodiment, the first flicker value storage may be same as the second flicker value storage.

In an exemplary embodiment, the dividing input image data may include dividing an input data enable signal corresponding to the input image data into a first data enable signal corresponding to the first area data and a second data enable signal corresponding to the second area data to generate the first data enable signal and the second data enable signal. The first data signal having the first driving frequency may be generated using the first data enable signal. The second data signal having the second driving frequency may be generated using the second data enable signal. The method may further include generating an integrated data signal by an OR operation of the first data signal and the second data signal.

In an exemplary embodiment, the outputting the gate signal may include inactivating an output of at least one of a first gate signal group corresponding to the first area data and a second gate signal group corresponding to the second area data based on the first driving frequency and the second driving frequency.

According to the display apparatus and the method of driving the display panel using the display apparatus, the input image data may be divided into the first area data and the second area data. The first driving frequency of the first area data may be determined based on a flicker value according to a grayscale value of the first area data. The second driving frequency of the second area data may be determined based on a flicker value according to a grayscale value of the second area data. Thus, the portion of the display panel displaying the video image may be driven in the high driving frequency and the portion of the display panel displaying the still image may be driven in the low driving frequency. Therefore, the power consumption of the display apparatus may be reduced.

In addition, the driving frequency is determined using the flicker value of the image displayed on the display panel so that a flicker of the image may be prevented and a display quality of the display panel may be enhanced.

BRIEF DESCRIPTION OF THE DRAWINGS

The above and other features and advantages of the invention will become more apparent by describing in detailed exemplary embodiments thereof with reference to the accompanying drawings, in which:

FIG. 6 is a table illustrating an exemplary embodiment of a first flicker value storage of FIG. 4 or a second flicker value storage of FIG. 5;

DETAILED DESCRIPTION

Figure 1:
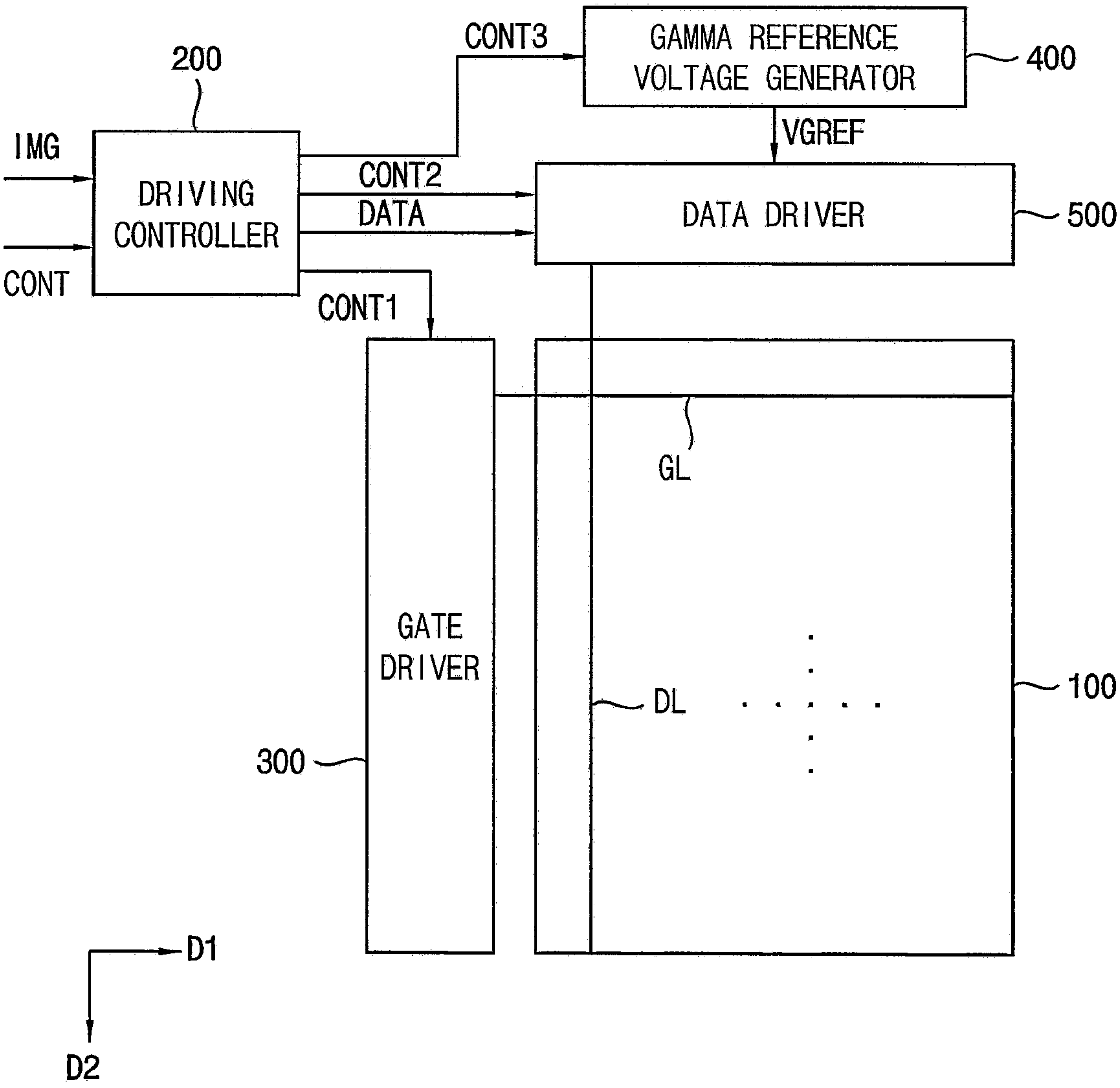
FIG. 1 is a block diagram illustrating an exemplary embodiment of a display apparatus according to the invention.

Hereinafter, the invention will be explained in detail with reference to the accompanying drawings.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a block diagram illustrating an exemplary embodiment of a display apparatus according to the invention.

Referring to FIG. 1, the display apparatus includes a display panel 100 and a display panel driver. The display panel driver includes a driving controller 200, a gate driver 300, a gamma reference voltage generator 400 and a data driver 500.

In an exemplary embodiment, the driving controller 200 and the data driver 500 may be unitary. In an exemplary embodiment, the driving controller 200, the gamma reference voltage generator 400 and the data driver 500 may be unitary, for example. A driving module including at least the driving controller 200 and the data driver 500 which are unitary may be referred to as a timing controller embedded data driver ("TED").

The display panel driver may further include an emission driver outputting an emission signal to the display panel 100. The display panel driver may further include a power voltage generator providing a power voltage to at least one of the display panel 100, the driving controller 200, the gate driver 300, the gamma reference voltage generator 400 and the data driver 500.

The display panel 100 has a display region on which an image is displayed and a peripheral region adjacent to the display region.

The display panel 100 includes a plurality of gate lines GL, a plurality of data lines DL and a plurality of pixels connected to the gate lines GL and the data lines DL. The gate lines GL extend in a first direction D1 and the data lines DL extend in a second direction D2 crossing the first direction D1.

The driving controller 200 receives input image data IMG and an input control signal CONT from an external apparatus (not shown). In an exemplary embodiment, the input image data IMG may include red image data, green image data and blue image data, for example. In an exemplary embodiment, the input image data IMG may include white image data, for example. In an exemplary embodiment, the input image data IMG may include magenta image data, yellow image data and cyan image data, for example. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

In an exemplary embodiment, the driving controller 200 may adjust a driving frequency of the display panel 100 based on the input image data IMG, for example.

The driving controller 200 generates the third control signal CONT3 for controlling an operation of the gamma reference voltage generator 400 based on the input control signal CONT, and outputs the third control signal CONT3 to the gamma reference voltage generator 400.

A structure and an operation of the driving controller 200 are explained referring to FIGS. 3 to 7 and 10 in detail.

The gate driver 300 generates gate signals driving the gate lines GL in response to the first control signal CONT1 received from the driving controller 200. The gate driver 300 outputs the gate signals to the gate lines GL. In an exemplary embodiment, the gate driver 300 may sequentially output the gate signals to the gate lines GL, for example. In an exemplary embodiment, the gate driver 300 may be disposed (e.g., mounted) on the peripheral region of the display panel 100, for example. In an exemplary embodiment, the gate driver 300 may be integrated on the peripheral region of the display panel 100, for example.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an exemplary embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL. In an exemplary embodiment, the data driver 500 may be disposed (e.g., mounted) on the peripheral region of the display panel 100, for example. In an exemplary embodiment, the data driver 500 may be integrated on the peripheral region of the display panel 100, for example.

Figure 2:
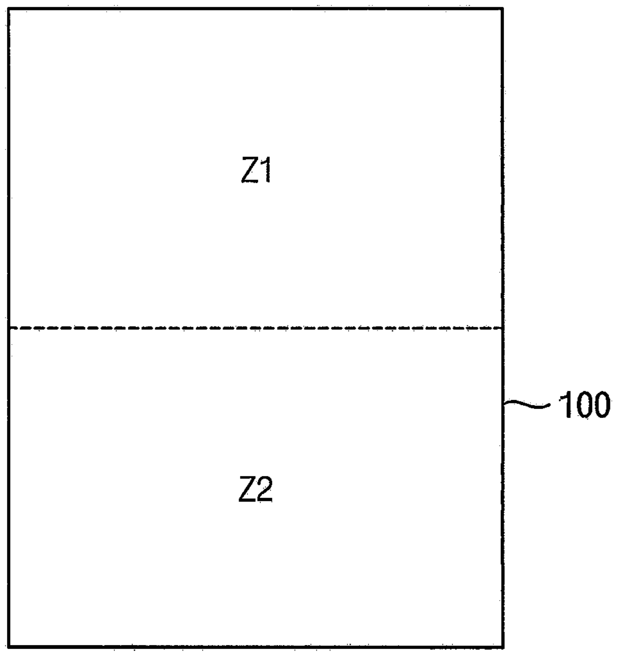
FIG. 2 is a conceptual diagram illustrating a display panel of FIG. 1 which is divided into a first area and a second area.
Figure 3:
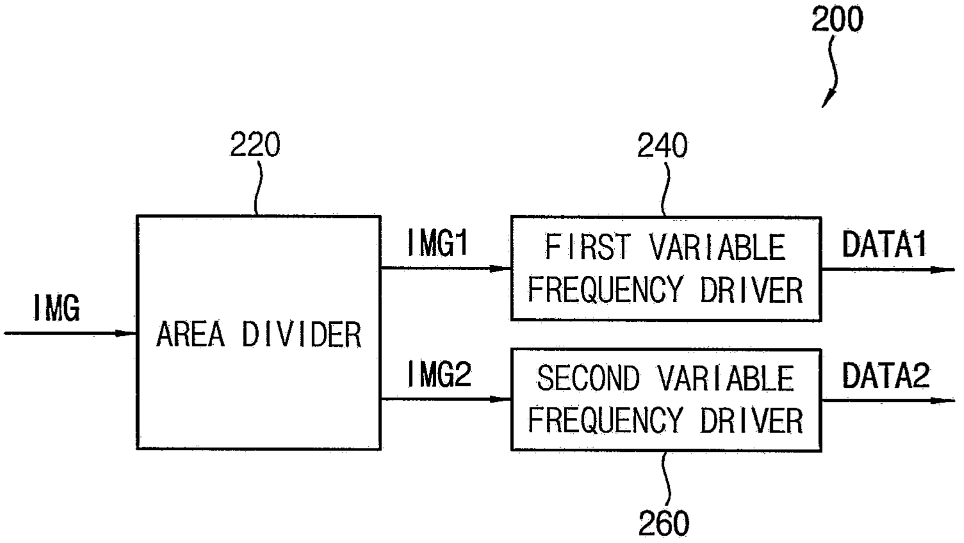
FIG. 3 is a block diagram illustrating a driving controller of FIG. 1.

FIG. 2 is a conceptual diagram illustrating a display panel 100 of FIG. 1 which is divided into a first area Z1 and a second area Z2. FIG. 3 is a block diagram illustrating the driving controller 200 of FIG. 1.

Referring to FIGS. 1 to 3, the display panel 100 may be divided into a plurality of areas. The divided areas may be adjacent to each other in the second direction D2. In an exemplary embodiment, the display panel 100 may be divided into two areas, for example.

The driving controller 200 includes an area divider 220, a first variable frequency driver 240 and a second variable frequency driver 260.

The area divider 220 may divide the input image data IMG into first area data IMG1 corresponding to the first area Z1 of the display panel 100 and second area data IMG2 corresponding to the second area Z2 of the display panel 100. In addition, the area divider 220 may divide the input control signal CONT into a first input control signal corresponding to the first area Z1 and a second input control signal corresponding to the second area Z2.

A first driving frequency of the first area Z1 may be determined by the first variable frequency driver 240. A second driving frequency of the second area Z2 may be determined by the second variable frequency driver 260.

The first variable frequency driver 240 may determine a first driving frequency of the first area data IMG1 based on a flicker value according to a grayscale value of the first area data IMG1 when the first area data IMG1 represents a still image. The first variable frequency driver 240 may generate a first data signal DATA1 of the first driving frequency based on the first area data IMG1.

The second variable frequency driver 260 may determine a second driving frequency of the second area data IMG2 based on a flicker value according to a grayscale value of the second area data IMG2 when the second area data IMG2 represents a still image. The second variable frequency driver 260 may generate a second data signal DATA2 of the second driving frequency based on the second area data IMG2.

Figure 4:
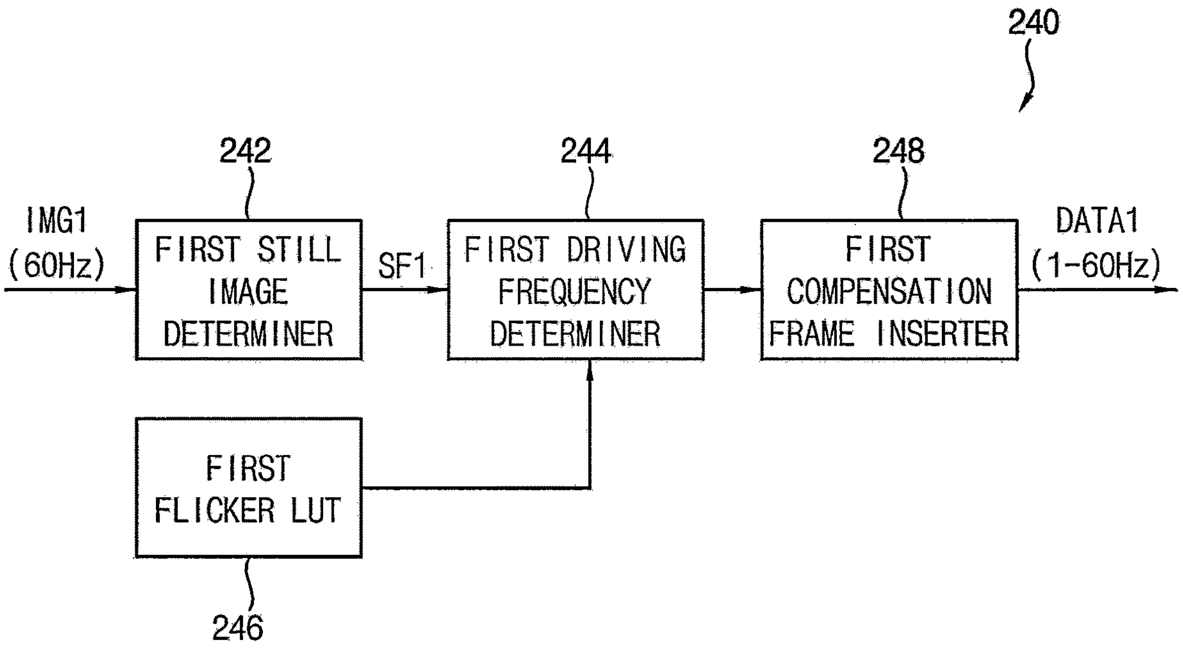
FIG. 4 is a block diagram illustrating a first variable frequency driver of FIG. 3.
Figure 5:
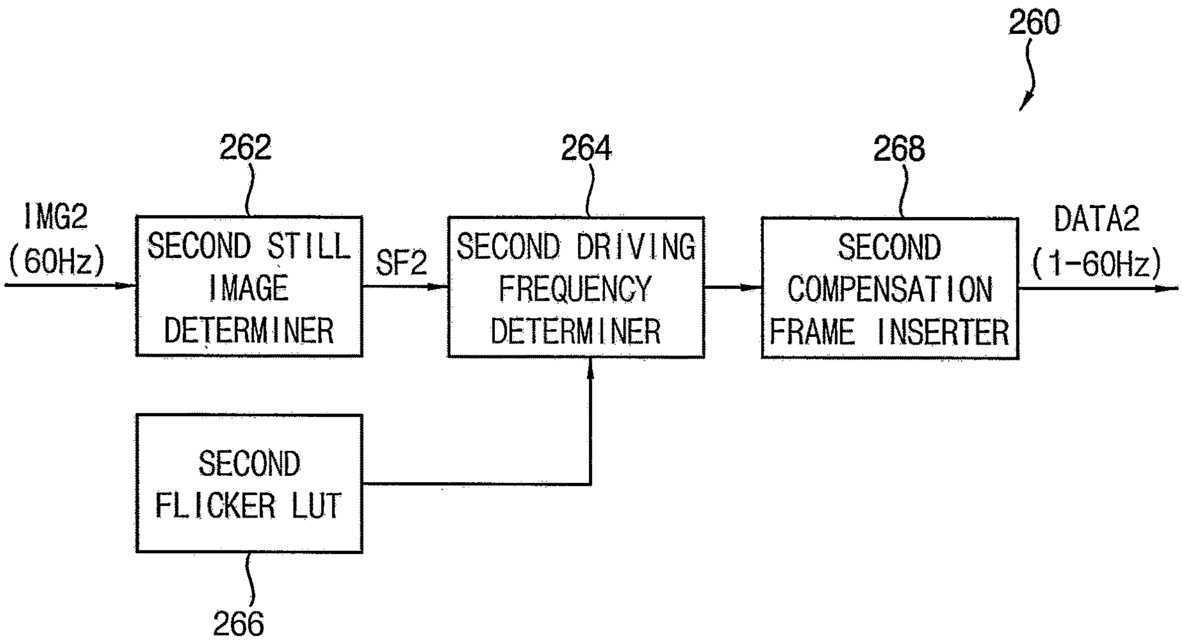
FIG. 5 is a block diagram illustrating a second variable frequency driver of FIG. 3.

FIG. 4 is a block diagram illustrating the first variable frequency driver 240 of FIG. 3. FIG. 5 is a block diagram illustrating the second variable frequency driver 260 of FIG. 3. FIG. 6 is a table illustrating an exemplary embodiment of a first flicker value storage 246 of FIG. 4 or a second flicker value storage 266 of FIG. 5.

Referring to FIGS. 1 to 6, the first variable frequency driver 240 may include a first still image determiner 242, a first driving frequency determiner 244, a first flicker value storage 246 and a first compensation frame inserter 248.

The first still image determiner 242 may determine whether the first area data IMG1 represent a still image or a video image. The first still image determiner 242 may output a first flag SF1 representing whether the first area data IMG1 represents the still image or the video image to the first driving frequency determiner 244. In an exemplary embodiment, when the first area data IMG1 represent the still image, the first still image determiner 242 may output the first flag SF1 of 1 to the first driving frequency determiner 244, for example. In an exemplary embodiment, when the first area data IMG1 represent the video image, the first still image determiner 242 may output the first flag SF1 of 0 to the first driving frequency determiner 244, for example. In an exemplary embodiment, when the display panel 100 is operated in always on mode, the first still image determiner 242 may output the first flag SF1 of 1 to the first driving frequency determiner 244, for example.

In an exemplary embodiment, when the first flag SF1 is 1, the first driving frequency determiner 244 may drive switching elements of pixels in the first area Z1 in a low driving frequency, for example. In an exemplary embodiment, when the first flag SF1 is 0, the first driving frequency determiner 244 may drive switching elements of pixels in the first area Z1 in a normal driving frequency, for example.

The first driving frequency determiner 244 may refer the first flicker value storage 246 to determine the low driving frequency. The first flicker value storage 246 may include a flicker value representing a degree of a flicker according to a grayscale value of the first area data IMG1.

The first flicker value storage 246 may store the grayscale value of the first area data IMG1 and the flicker value corresponding to the grayscale value of the first area data IMG1. The flicker value may be used for determining the driving frequency of the first area data IMG1. The first flicker value storage 246 may be a first flicker lookup table ("LUT").

In FIG. 6, the input grayscale value of the first area data IMG1 may be 8 bits, the minimum grayscale value of the first area data IMG1 may be 0 and the maximum grayscale value of the first area data IMG1 may be 255, for example. The number of flicker setting stages of the first flicker value storage 246 may be 64, for example. When the number of the flicker setting stages increases, the flicker may be effectively removed but a logic size of the driving controller 200 may increase, for example. Thus, the number of the flicker setting stages may be limited.

In FIG. 6, the number of the grayscale values of the first area data IMG1 is 256 and the number of the flicker setting stages is 64 so that a single flicker value in the first flicker value storage 246 may correspond to four grayscale values. In an exemplary embodiment, a first flicker setting stage stores the flicker value of 0 for the grayscale values of 0 to 3, for example. Herein, the flicker value of 0 may represent the driving frequency of about 1 Hertz (Hz). In an exemplary embodiment, a second flicker setting stage stores the flicker value of 0 for the grayscale values of 4 to 7, for example. Herein, the flicker value of 0 may represent the driving frequency of about 1 Hz. In an exemplary embodiment, a third flicker setting stage stores the flicker value of 40 for the grayscale values of 8 to 11, for example. Herein, the flicker value of 40 may represent the driving frequency of about 2 Hz. In an exemplary embodiment, a fourth flicker setting stage stores the flicker value of 80 for the grayscale values of 12 to 15, for example. Herein, the flicker value of 80 may represent the driving frequency of about 5 Hz. In an exemplary embodiment, a fifth flicker setting stage stores the flicker value of 120 for the grayscale values of 16 to 19, for example. Herein, the flicker value of 120 may represent the driving frequency of about 10 Hz. In an exemplary embodiment, a sixth flicker setting stage stores the flicker value of 160 for the grayscale values of 20 to 23, for example. Herein, the flicker value of 160 may represent the driving frequency of about 30 Hz. In an exemplary embodiment, a seventh flicker setting stage stores the flicker value of 200 for the grayscale values of 24 to 27, for example. Herein, the flicker value of 200 may represent the driving frequency of about 60 Hz. In an exemplary embodiment, a sixty second flicker setting stage stores the flicker value of 0 for the grayscale values of 244 to 247. Herein, the flicker value of 0 may represent the driving frequency of about 1 Hz, for example. In an exemplary embodiment, a sixty third flicker setting stage stores the flicker value of 0 for the grayscale values of 248 to 251. Herein, the flicker value of 0 may represent the driving frequency of about 1 Hz, for example. In an exemplary embodiment, a sixty fourth flicker setting stage stores the flicker value of 0 for the grayscale values of 252 to 255, for example. Herein, the flicker value of 0 may represent the driving frequency of about 1 Hz.

When the first driving frequency is changed from a first frequency to a second frequency by the first driving frequency determiner 244, the first compensation frame inserter 248 may insert a first compensation frame between a frame of the first frequency and a frame of the second frequency.

The first compensation frame inserter 248 may determine a frequency of the first compensation frame and the number of the first compensation frames. In an exemplary embodiment, when the first driving frequency is changed from the first frequency to the second frequency, the frequency of the first compensation frame may be determined to a value between the first frequency and the second frequency, for example. In an exemplary embodiment, when the first driving frequency is changed from about 60 Hz to about 10 Hz, the frequency of the first compensation frame may be determined to one of about 30 Hz, about 20 Hz and about 15 Hz, for example. In an exemplary embodiment, when the first driving frequency is changed from about 60 Hz to about 1 Hz, the frequency of the first compensation frame may be determined to one of about 30 Hz, about 20 Hz, about 15 Hz, about 10 Hz, about 5 Hz and about 2 Hz, for example. The first compensation frame inserter 248 may determine a plurality of the frequencies of the first compensation frames.

The first compensation frame inserter 248 may determine the number of the first compensation frames based on a difference between the first frequency and the second frequency. In an exemplary embodiment, when the difference between the first frequency and the second frequency is little, the number of the first compensation frames may be little, for example. In contrast, in an exemplary embodiment, when the difference between the first frequency and the second frequency is great, the number of the first compensation frames may be great, for example.

The second variable frequency driver 260 may include a second still image determiner 262, a second driving frequency determiner 264, a second flicker value storage 266 and a second compensation frame inserter 268.

The second still image determiner 262 may determine whether the second area data IMG2 represent a still image or a video image. The second still image determiner 262 may output a second flag SF2 representing whether the second area data IMG2 represents the still image or the video image to the second driving frequency determiner 264. In an exemplary embodiment, when the second area data IMG2 represent the still image, the second still image determiner 262 may output the second flag SF2 of 1 to the second driving frequency determiner 264, for example. When the second area data IMG2 represent the video image, the second still image determiner 262 may output the second flag SF2 of 0 to the second driving frequency determiner 264, for example. When the display panel 100 is operated in always on mode, the second still image determiner 262 may output the second flag SF2 of 1 to the second driving frequency determiner 264.

When the second flag SF2 is 1, the second driving frequency determiner 264 may drive switching elements of pixels in the second area Z2 in a low driving frequency. When the second flag SF2 is 0, the second driving frequency determiner 264 may drive switching elements of pixels in the second area Z2 in a normal driving frequency.

The second driving frequency determiner 264 may refer the second flicker value storage 266 to determine the low driving frequency. The second flicker value storage 266 may include a flicker value representing a degree of a flicker according to a grayscale value of the second area data IMG2. The second flicker value storage 266 may be a second flicker LUT.

The second flicker value storage 266 may store the grayscale value of the second area data IMG2 and the flicker value corresponding to the grayscale value of the second area data IMG2. The flicker value may be used for determining the driving frequency of the second area data IMG2.

In an exemplary embodiment, the first flicker value storage 246 may be provided independently from the second flicker value storage 266. In an alternative exemplary embodiment, the first flicker value storage 246 may be a same element as the second flicker value storage 266. In an exemplary embodiment, the first flicker value storage 246 may include data substantially the same as the second flicker value storage 266 so that the first flicker value storage 246 may be the provided as the same element as the second flicker value storage 266 to reduce the complexity and the manufacturing cost of the display apparatus, for example.

When the second driving frequency is changed from a third frequency to a fourth frequency by the second driving frequency determiner 264, the second compensation frame inserter 268 may insert a second compensation frame between a frame of the third frequency and a frame of the fourth frequency.

Figure 7:
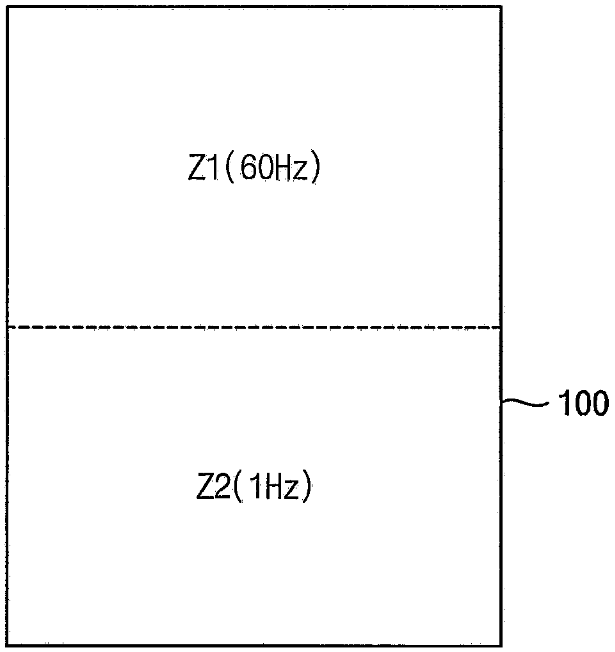
FIG. 7 is a conceptual diagram illustrating the display panel of FIG. 1 which is divided into the first area driven in a frequency of about 60 Hertz (Hz) and a second area driven in a frequency of about 1 Hz.
Figure 8:
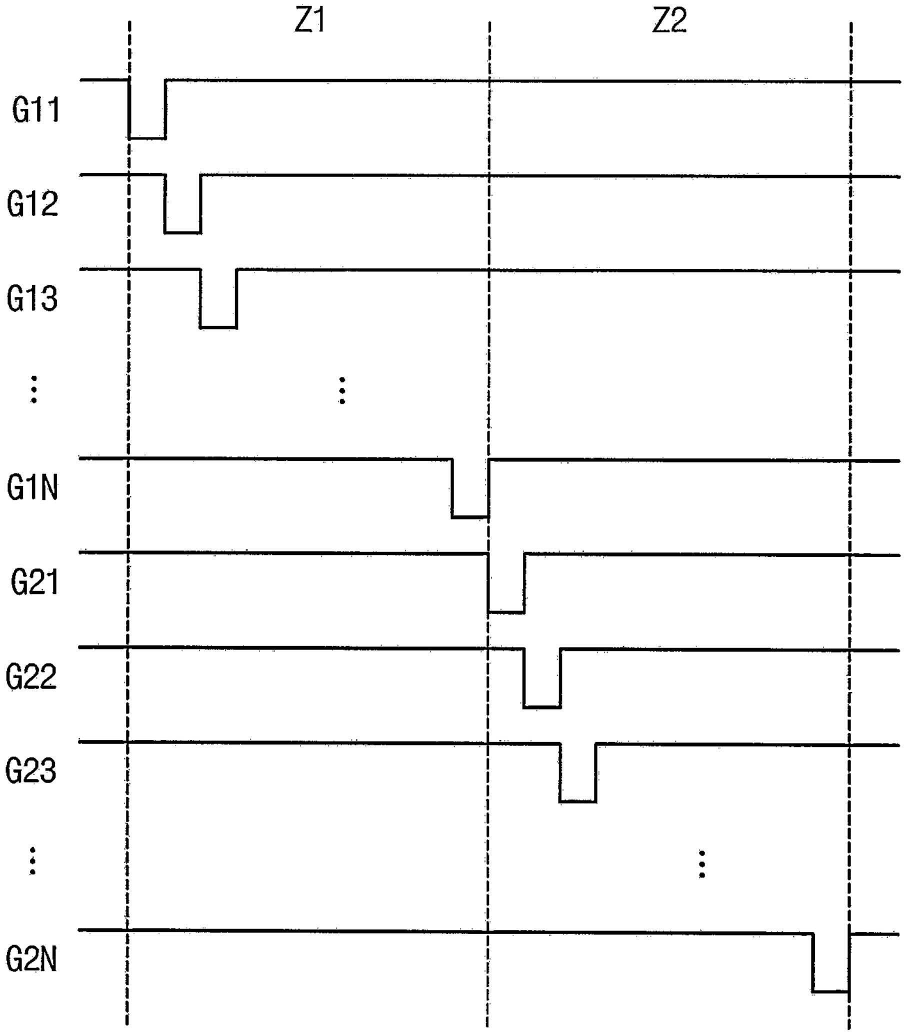
FIG. 8 is a timing diagram illustrating a gate signal outputted from a gate driver during a first frame in a case of FIG. 7.
Figure 9:
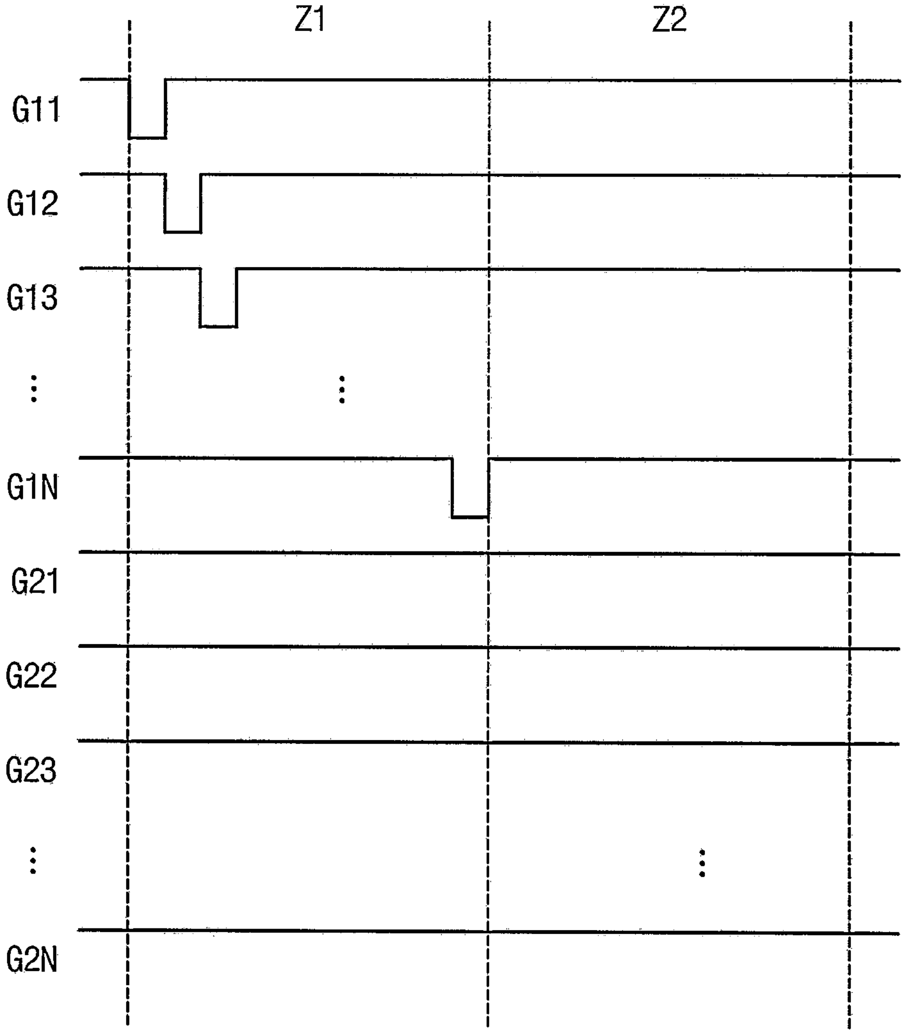
FIG. 9 is a timing diagram illustrating a gate signal outputted from the gate driver during a second frame in the case of FIG. 7.
Figure 10:
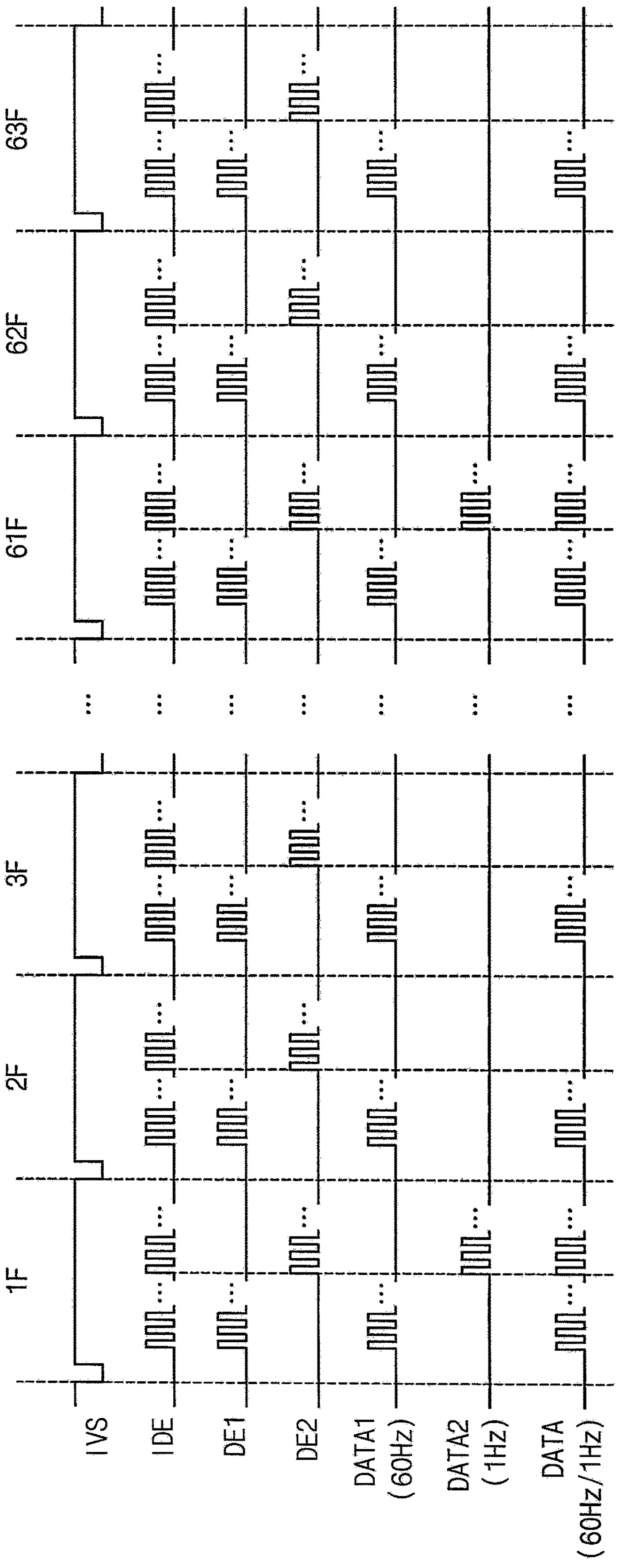
FIG. 10 is a timing diagram illustrating an input signal, a generated signal and an output signal of the driving controller of FIG. 1.

FIG. 7 is a conceptual diagram illustrating the display panel 100 of FIG. 1 which is divided into the first area Z1 driven in a frequency of about 60 Hz and a second area Z2 driven in a frequency of about 1 Hz. FIG. 8 is a timing diagram illustrating a gate signal outputted from the gate driver 300 during a first frame in a case of FIG. 7. FIG. 9 is a timing diagram illustrating a gate signal outputted from the gate driver 300 during a second frame in the case of FIG. 7. FIG. 10 is a timing diagram illustrating an input signal, a generated signal and an output signal of the driving controller 200 of FIG. 1.

Referring to FIGS. 1 to 10, for example, the first driving frequency determiner 244 may determine the first driving frequency of the first area Z1 of the display panel 100 to about 60 Hz and the second driving frequency determiner 264 may determine the second driving frequency of the second area Z2 of the display panel 100 to about 1 Hz.

The gate driver 300 may output a first gate signal group G11 to G1N corresponding to the first area data IMG1 and a second gate signal group G21 to G2N corresponding to the second area data IMG2 where N is a natural number greater than one.

The gate driver 300 may inactivate an output of at least one of the first gate signal group G11 to G1N and the second gate signal group G21 to G2N based on the first driving frequency and the second driving frequency.

In an exemplary embodiment, when the first frequency of the first area Z1 is about 60 Hz and the second frequency of the second area Z2 is about 1 Hz, the first area Z1 may have sixty writing frames in a second and the second area Z2 may have one writing frame and fifty nine holding frames in a second, for example.

When the first area Z1 has the writing frame, the first gate signal group G11 to G1N corresponding to the first area Z1 may be activated. When the first area Z1 has the holding frame, the first gate signal group G11 to G1N corresponding to the first area Z1 may be inactivated. In an exemplary embodiment, the first gate signal group G11 to G1N may be inactivated by a masking method, for example.

When the second area Z2 has the writing frame, the second gate signal group G21 to G2N corresponding to the second area Z2 may be activated. When the second area Z2 has the holding frame, the second gate signal group G21 to G2N corresponding to the second area Z2 may be inactivated. In an exemplary embodiment, the second gate signal group G21 to G2N may be inactivated by a masking method, for example.

In an exemplary embodiment, FIG. 8 represents a first frame. Both of the first area Z1 and the second area Z2 may have the writing frames in the first frame, for example. Thus, the first gate signal group G11 to G1N and the second gate signal group G21 to G2N are activated in the first frame.

In an exemplary embodiment, FIG. 9 represents a second frame, for example. The first area Z1 may have the writing frame and the second area Z2 may have the holding frame in the second frame. Thus, the first gate signal group G11 to G1N is activated and the second gate signal group G21 to G2N is inactivated in the second frame.

In FIG. 10, the area divider 220 (refer to FIG. 3) may input an input vertical start signal IVS and an input data enable signal IDE. The input vertical start signal IVS may have a cycle of the frame. The input data enable signal IDE may have a cycle of a horizontal line period.

The area divider 220 may divide the input data enable signal IDE into a first data enable signal DE1 corresponding to the first area data IMG1 and a second data enable signal DE2 corresponding to the second area data IMG2 to generate the first data enable signal DE1 and the second data enable signal DE2.

The first variable frequency driver 240 (refer to FIG. 3) may generate the first data signal DATA1 having the first driving frequency using the first data enable signal DE1. The second variable frequency driver 260 (refer to FIG. 3) may generate the second data signal DATA2 having the second driving frequency using the second data enable signal DE2.

The driving controller 200 (refer to FIGS. 1 and 3) may generate an integrated data signal DATA based on the first data signal DATA1 and the second data signal DATA2. The driving controller 200 may output the integrated data signal DATA to the data driver 500.

In an exemplary embodiment, the driving controller 200 may generate the integrated data signal DATA by an OR operation of the first data signal DATA1 and the second data signal DATA2, for example.

In the illustrated exemplary embodiment, the input image data IMG may be divided into the first area data IMG1 and the second area data IMG2. The first driving frequency of the first area data IMG1 may be determined based on the flicker value according to the grayscale value of the first area data IMG1. The second driving frequency of the second area data IMG2 may be determined based on the flicker value according to the grayscale value of the second area data IMG2. Thus, the portion of the display panel 100 displaying the video image may be driven in the high driving frequency and the portion of the display panel 100 displaying the still image may be driven in the low driving frequency. Therefore, the power consumption of the display apparatus may be reduced.

In addition, the driving frequency is determined using the flicker value of the image displayed on the display panel 100 so that the flicker of the image may be prevented and the display quality of the display panel 100 may be enhanced.

Figure 11:
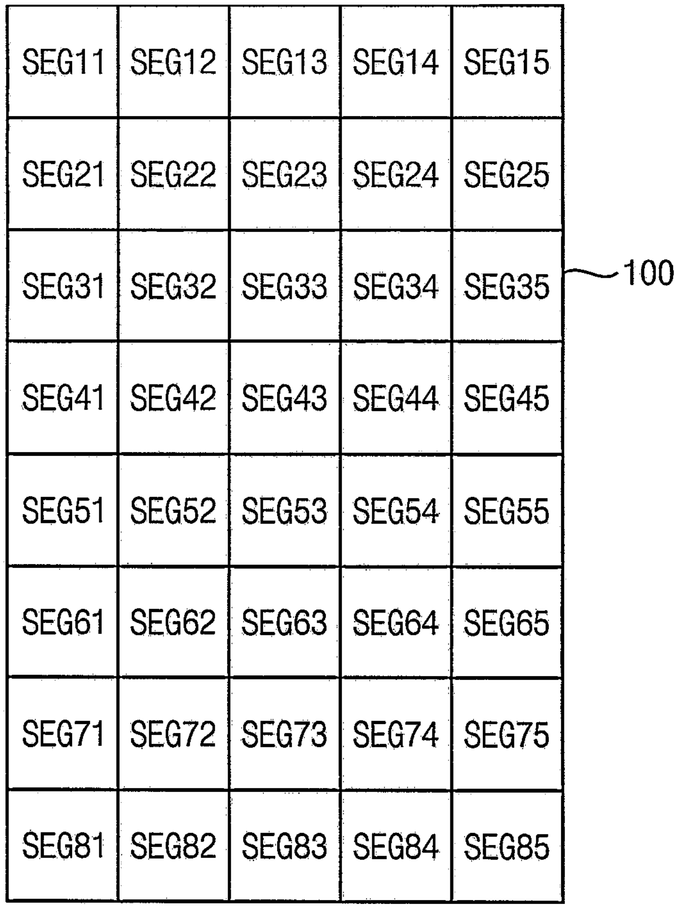
FIG. 11 is a conceptual diagram illustrating an exemplary embodiment of a display panel of a display apparatus according to the invention.
Figure 12:
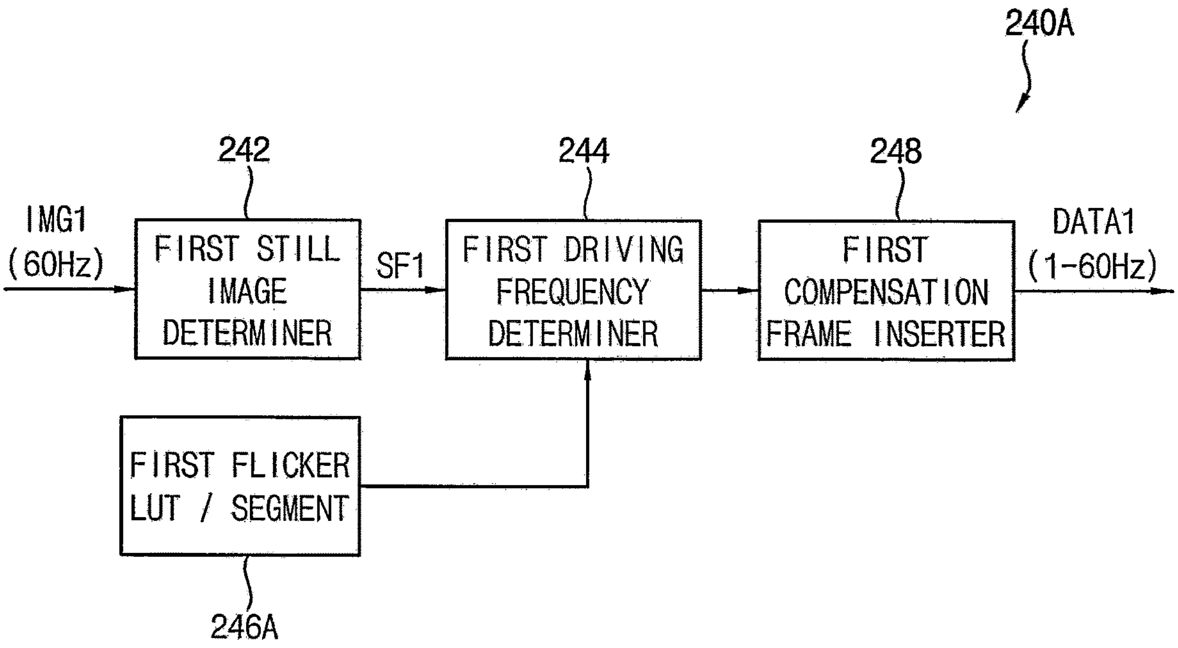
FIG. 12 is a block diagram illustrating a first variable frequency driver of the display apparatus of FIG. 11.
Figure 13:
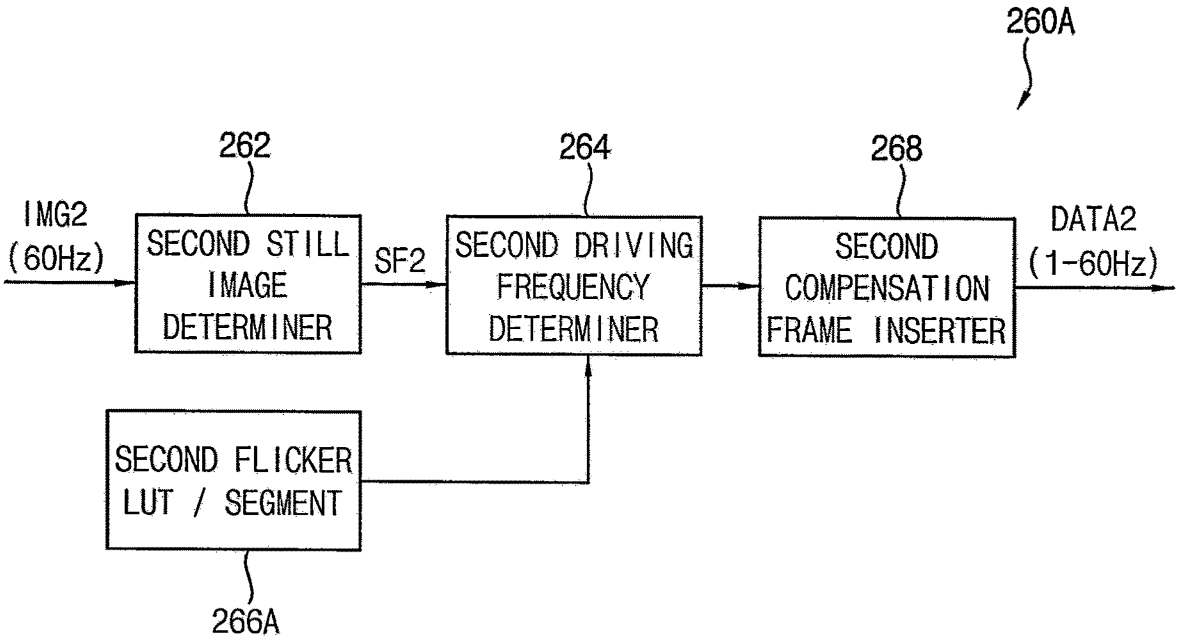
FIG. 13 is a block diagram illustrating a second variable frequency driver of the display apparatus of FIG. 11.

FIG. 11 is a conceptual diagram illustrating an exemplary embodiment of a display panel 100 of a display apparatus according to the invention. FIG. 12 is a block diagram illustrating a first variable frequency driver 240A of the display apparatus of FIG. 11. FIG. 13 is a block diagram illustrating a second variable frequency driver 260A of the display apparatus of FIG. 11.

The display apparatus and the method of driving the display panel in the illustrated exemplary embodiment is substantially the same as the display apparatus and the method of driving the display panel of the previous exemplary embodiment explained referring to FIGS. 1 to 10 except that the display area is divided into a plurality of segments. Thus, the same reference numerals will be used to refer to the same or like parts as those described in the previous exemplary embodiment of FIGS. 1 to 10 and any repetitive explanation concerning the above elements will be omitted.

Referring to FIGS. 1, 2 and 6 to 13, the display apparatus includes a display panel 100 and a display panel driver. The display panel driver includes a driving controller 200, a gate driver 300, a gamma reference voltage generator 400 and a data driver 500.

The display panel 100 may include a plurality of segments SEG11 to SEG85. Although the display panel 100 includes the segments in an eight by five matrix in the illustrated exemplary embodiment, the invention is not limited thereto.

In an exemplary embodiment, the first area Z1 may include segments SEG11 to SEG45 in first to fourth rows, for example. The second area Z2 may include segments SEG51 to SEG85 in fifth to eighth rows.

When the flicker value is determined for a unit of the pixel and only one pixel has a high flicker value, the entire display panel may be driven in a high driving frequency to prevent the flicker in the one pixel. In an exemplary embodiment, when a flicker of only one pixel is prevented in the driving frequency of about 30 Hz and the other pixels do not generate the flicker in the driving frequency of about 1 Hz, the display panel 100 may be driven in the driving frequency of about 30 Hz and the power consumption of the display apparatus may be higher than necessary, for example.

Thus, when the display panel 100 is divided into the segments and the flicker value is determined for a unit of the segment, the power consumption of the display apparatus may be effectively reduced.

The driving controller 200 includes an area divider 220, the first variable frequency driver 240A and the second variable frequency driver 260A.

The first variable frequency driver 240A may determine optimal driving frequencies for the segments in the first area Z1 and may determine the maximum driving frequency among the optimal driving frequencies for the segments as the low driving frequency of the first area Z1.

In an exemplary embodiment, when an optimal driving frequency for a first segment SEG11 is about 10 Hz and optimal driving frequencies for the other segments SEG12 to SEG45 except for the first segment SEG11 are about 2 Hz, the first variable frequency driver 240A may determine the low driving frequency of the first area Z1 to about 10 Hz, for example.

The second variable frequency driver 260A may determine optimal driving frequencies for the segments in the second area Z2 and may determine the maximum driving frequency among the optimal driving frequencies for the segments as the low driving frequency of the second area Z2.

The first variable frequency driver 240A may include a first still image determiner 242, a first driving frequency determiner 244, a first flicker value storage 246A and a first compensation frame inserter 248. The first driving frequency determiner 244 may refer the first flicker value storage 246A and information of the segment of the first area Z1 to determine the low driving frequency of the first area Z1.

The second variable frequency driver 260A may include a second still image determiner 262, a second driving frequency determiner 264, a second flicker value storage 266A and a second compensation frame inserter 268. The second driving frequency determiner 264 may refer the second flicker value storage 266A and information of the segment of the second area Z2 to determine the low driving frequency of the second area Z2.

In the illustrated exemplary embodiment, the input image data IMG may be divided into the first area data IMG1 and the second area data IMG2. The first driving frequency of the first area data IMG1 may be determined based on the flicker value according to the grayscale value of the first area data IMG1. The second driving frequency of the second area data IMG2 may be determined based on the flicker value according to the grayscale value of the second area data IMG2. Thus, the portion of the display panel 100 displaying the video image may be driven in the high driving frequency and the portion of the display panel 100 displaying the still image may be driven in the low driving frequency. Therefore, the power consumption of the display apparatus may be reduced.

In addition, the driving frequency is determined using the flicker value of the image displayed on the display panel 100 so that the flicker of the image may be prevented and the display quality of the display panel 100 may be enhanced.

Figure 14:
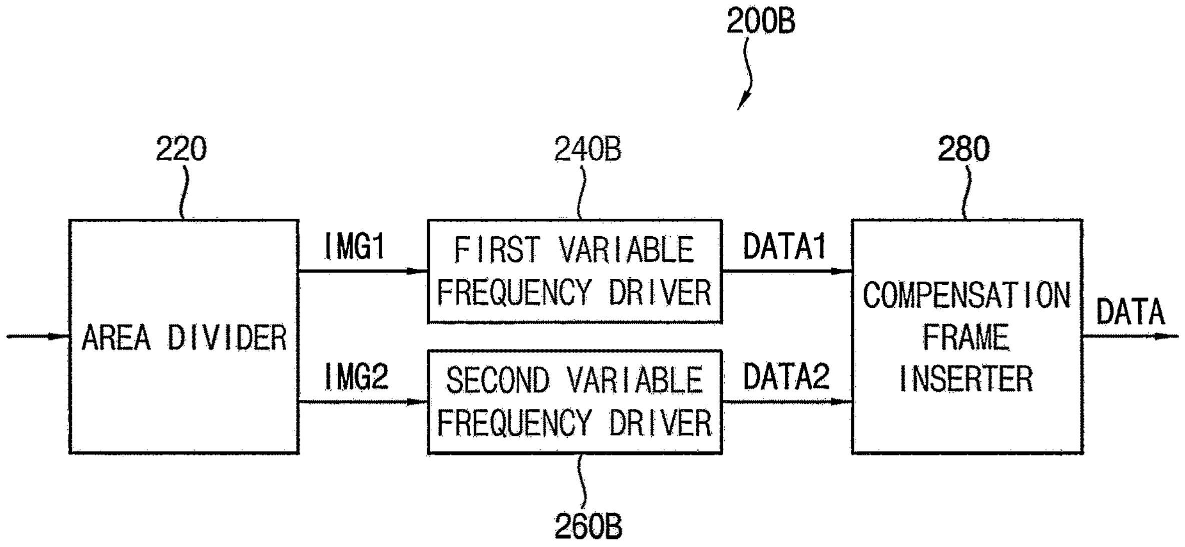
FIG. 14 is a block diagram illustrating an exemplary embodiment of a driving controller of a display apparatus according to the invention.
Figure 15:
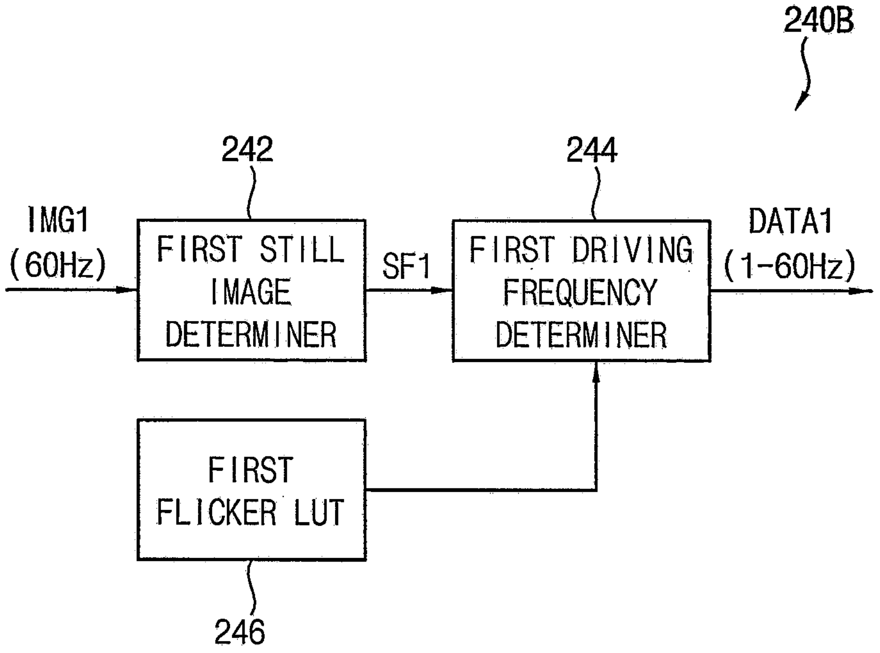
FIG. 15 is a block diagram illustrating a first variable frequency driver of the display apparatus of FIG. 14.
Figure 16:
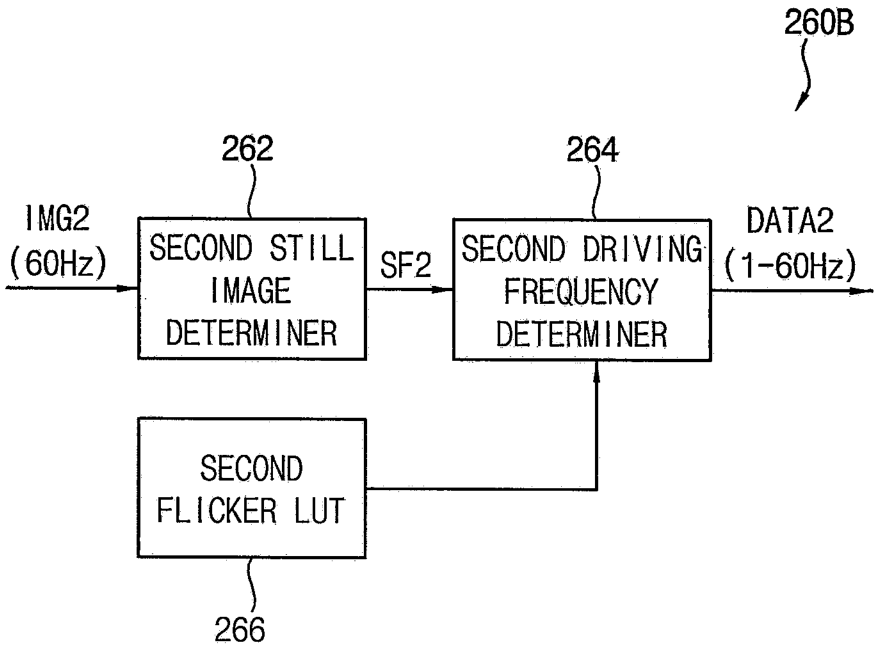
FIG. 16 is a block diagram illustrating a second variable frequency driver of the display apparatus of FIG. 14.

FIG. 14 is a block diagram illustrating an exemplary embodiment of a driving controller of a display apparatus according to the invention. FIG. 15 is a block diagram illustrating a first variable frequency driver of the display apparatus of FIG. 14. FIG. 16 is a block diagram illustrating a second variable frequency driver of the display apparatus of FIG. 14.

The display apparatus and the method of driving the display panel in the illustrated exemplary embodiment is substantially the same as the display apparatus and the method of driving the display panel of the previous exemplary embodiment explained referring to FIGS. 1 to 10 except for the structure of the driving controller. Thus, the same reference numerals will be used to refer to the same or like parts as those described in the previous exemplary embodiment of FIGS. 1 to 10 and any repetitive explanation concerning the above elements will be omitted.

Referring to FIGS. 1, 2, 6 to 10 and 14 to 16, the display apparatus includes a display panel 100 and a display panel driver. The display panel driver includes a driving controller 200B, a gate driver 300, a gamma reference voltage generator 400 and a data driver 500.

The driving controller 200B includes an area divider 220, a first variable frequency driver 240B, a second variable frequency driver 260B and a compensation frame inserter 280.

The area divider 220 may divide the input image data IMG into first area data IMG1 corresponding to the first area Z1 of the display panel 100 and second area data IMG2 corresponding to the second area Z2 of the display panel 100.

The first variable frequency driver 240B may determine a first driving frequency of the first area data IMG1 based on a flicker value according to a grayscale value of the first area data IMG1 when the first area data IMG1 represents a still image.

The second variable frequency driver 260B may determine a second driving frequency of the second area data IMG2 based on a flicker value according to a grayscale value of the second area data IMG2 when the second area data IMG2 represents a still image.

The compensation frame inserter 280 may insert a compensation frame in the first area data IMG1 and the second area data IMG2 when at least one of the first driving frequency and the second driving frequency is changed.

The first variable frequency driver 240B may include a first still image determiner 242, a first driving frequency determiner 244 and a first flicker value storage 246. The structures and the operations of the first still image determiner 242, the first driving frequency determiner 244 and the first flicker value storage 246 of the illustrated exemplary embodiment may be substantially the same the structures and the operations of the first still image determiner 242, the first driving frequency determiner 244 and the first flicker value storage 246 as explained in FIG. 4.

The second variable frequency driver 260B may include a second still image determiner 262, a second driving frequency determiner 264 and a second flicker value storage 266. The structures and the operations of the second still image determiner 262, the second driving frequency determiner 264 and the second flicker value storage 266 of the illustrated exemplary embodiment may be substantially the same the structures and the operations of the second still image determiner 262, the second driving frequency determiner 264 and the second flicker value storage 266 as explained in FIG. 5.

In the illustrated exemplary embodiment, the driving controller 200B may include the single compensation frame inserter 280 instead the first and second variable frequency driver 240 and 260 respectively include the first and second compensation frame inserters 248 and 268.

In an exemplary embodiment, when the first driving frequency is changed from a first frequency to a second frequency by the first variable frequency driver 240B and the second driving frequency is changed from a third frequency to a fourth frequency by the second variable frequency driver 260B, the compensation frame inserter 280 may determine a frequency of the compensation frame and the number of the compensation frames based on a maximum value among a difference between the first frequency and the second frequency, a difference between the first frequency and the fourth frequency, a difference between the third frequency and the second frequency and a difference between the third frequency and the fourth frequency, for example.

The compensation frame inserter 280 may generate the compensation frame based on the worst case having the maximum difference between the frequency before the change and the frequency after the change so that the display defect such as the flicker may be prevented.

In an exemplary embodiment, when the first driving frequency is changed from a first frequency to a second frequency by the first variable frequency driver 240B and the second driving frequency is changed from a third frequency to a fourth frequency by the second variable frequency driver 260B, the compensation frame inserter 280 may determine a frequency of the compensation frame and the number of the compensation frames based on a greater value between a difference between the first frequency and the second frequency and a difference between the third frequency and the fourth frequency, for example.

The compensation frame inserter 280 may generate the compensation frame based on the worst case among the difference between the frequency before the change and the frequency after the change in the first area Z1 and the difference between the frequency before the change and the frequency after the change in the second area Z2 so that the display defect such as the flicker may be prevented.

In the illustrated exemplary embodiment, the input image data IMG may be divided into the first area data IMG1 and the second area data IMG2. The first driving frequency of the first area data IMG1 may be determined based on the flicker value according to the grayscale value of the first area data IMG1. The second driving frequency of the second area data IMG2 may be determined based on the flicker value according to the grayscale value of the second area data IMG2. Thus, the portion of the display panel 100 displaying the video image may be driven in the high driving frequency and the portion of the display panel 100 displaying the still image may be driven in the low driving frequency. Therefore, the power consumption of the display apparatus may be reduced.

In addition, the driving frequency is determined using the flicker value of the image displayed on the display panel 100 so that the flicker of the image may be prevented and the display quality of the display panel 100 may be enhanced.

Figure 17:
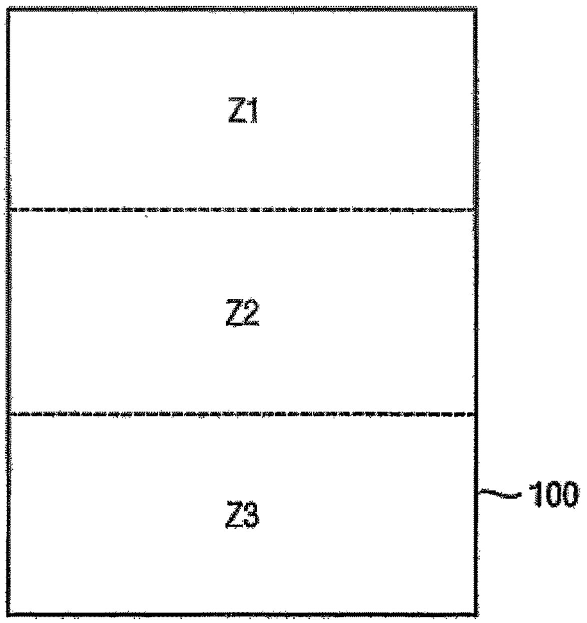
FIG. 17 is a conceptual diagram illustrating an exemplary embodiment of a display panel of a display apparatus which is divided into a first area, a second area and a third area according to the invention.
Figure 18:
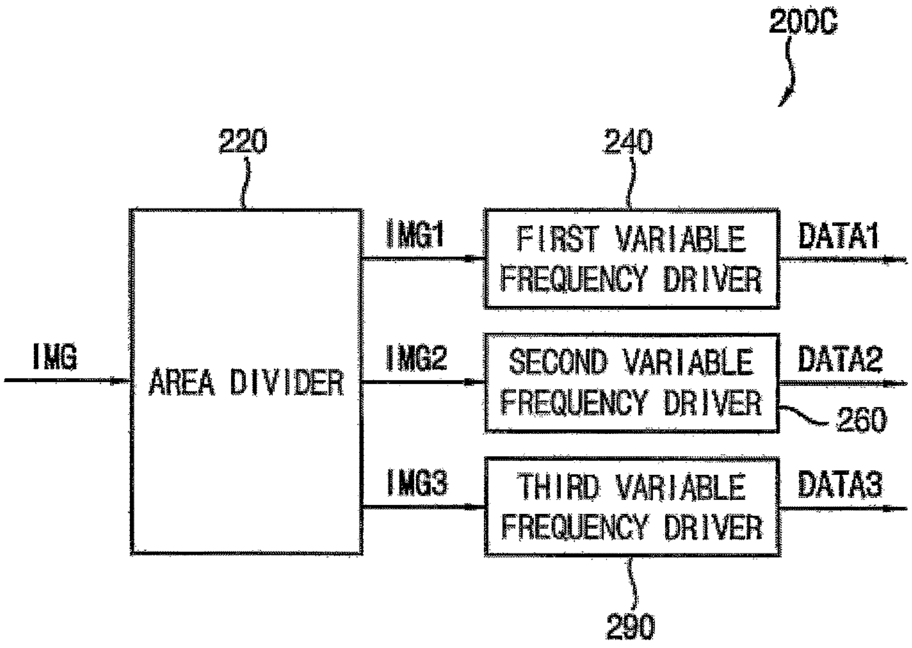
FIG. 18 is a block diagram illustrating a driving controller of the display apparatus of FIG. 17.

FIG. 17 is a conceptual diagram illustrating an exemplary embodiment of a display panel 100 of a display apparatus which is divided into a first area Z1, a second area Z2 and a third area Z3 according to the invention. FIG. 18 is a block diagram illustrating a driving controller 200C of the display apparatus of FIG. 17.

The display apparatus and the method of driving the display panel in the illustrated exemplary embodiment is substantially the same as the display apparatus and the method of driving the display panel of the previous exemplary embodiment explained referring to FIGS. 1 to 10 except that the display panel is divided into three areas. Thus, the same reference numerals will be used to refer to the same or like parts as those described in the previous exemplary embodiment of FIGS. 1 to 10 and any repetitive explanation concerning the above elements will be omitted.

Referring to FIGS. 1, 6 to 10, 17 and 18, the display apparatus includes a display panel 100 and a display panel driver. The display panel driver includes a driving controller 200C, a gate driver 300, a gamma reference voltage generator 400 and a data driver 500.

The display panel 100 may be divided into a plurality of areas. The divided areas may be adjacent to each other in the second direction D2. In an exemplary embodiment, the display panel 100 may be divided into three areas, for example.

The driving controller 200C includes an area divider 220, a first variable frequency driver 240, a second variable frequency driver 260 and a third variable frequency driver 290.

In an exemplary embodiment, the display panel 100 may be divided into four or more areas and the number of variable frequency drivers may be equal to the areas of the display panel 100.

The area divider 220 may divide the input image data IMG into first area data IMG1 corresponding to the first area Z1 of the display panel 100, second area data IMG2 corresponding to the second area Z2 of the display panel 100 and third area data IMG3 corresponding to the third area Z3 of the display panel 100.

A first driving frequency of the first area Z1 may be determined by the first variable frequency driver 240. A second driving frequency of the second area Z2 may be determined by the second variable frequency driver 260. A third driving frequency of the third area Z3 may be determined by the third variable frequency driver 290.

The first variable frequency driver 240 may determine a first driving frequency of the first area data IMG1 based on a flicker value according to a grayscale value of the first area data IMG1 when the first area data IMG1 represents a still image. The first variable frequency driver 240 may generate a first data signal DATA1 of the first driving frequency based on the first area data IMG1.

The second variable frequency driver 260 may determine a second driving frequency of the second area data IMG2 based on a flicker value according to a grayscale value of the second area data IMG2 when the second area data IMG2 represents a still image. The second variable frequency driver 260 may generate a second data signal DATA2 of the second driving frequency based on the second area data IMG2.

The third variable frequency driver 290 may determine a third driving frequency of the third area data IMG3 based on a flicker value according to a grayscale value of the third area data IMG3 when the third area data IMG3 represents a still image. The third variable frequency driver 290 may generate a third data signal DATA3 of the third driving frequency based on the third area data IMG3.

The structures of the first variable frequency driver 240 and the second variable frequency driver 260 may be same as the structures of the first variable frequency driver 240 and the second variable frequency driver 260 as explained referring to FIGS. 4 and 5. The structure of the third variable frequency driver 290 may be same as the structures of the first variable frequency driver 240 and the second variable frequency driver 260.

In the illustrated exemplary embodiment, the input image data IMG may be divided into the first area data IMG1, the second area data IMG2 and the third area data IMG3. The first driving frequency of the first area data IMG1 may be determined based on the flicker value according to the grayscale value of the first area data IMG1. The second driving frequency of the second area data IMG2 may be determined based on the flicker value according to the grayscale value of the second area data IMG2. The third driving frequency of the third area data IMG3 may be determined based on the flicker value according to the grayscale value of the third area data IMG3. Thus, the portion of the display panel 100 displaying the video image may be driven in the high driving frequency and the portion of the display panel 100 displaying the still image may be driven in the low driving frequency. Therefore, the power consumption of the display apparatus may be reduced.

In addition, the driving frequency is determined using the flicker value of the image displayed on the display panel 100 so that the flicker of the image may be prevented and the display quality of the display panel 100 may be enhanced.

According to the invention as explained above, the power consumption of the display apparatus may be reduced and the display quality of the display panel may be enhanced.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display apparatus comprising:

a display panel which comprises a gate line and a data line, and displays an image based on input image data, the display panel including a plurality of display areas;

a gate driver which outputs a gate signal to the gate line; and a driving controller which determines respective gate driving frequencies of the plurality of display areas of the display panel based on flicker values according to grayscale values of the display areas, wherein the flicker value has a same value for a flicker setting stage corresponding to at least two consecutive grayscale values of the grayscale values.

2. The display apparatus of claim 1, wherein the driving controller comprises:

an area divider which divides the input image data into a plurality of area data including first area data corresponding to a first area of the plurality of display areas and second area data corresponding to a second area of the plurality of display areas;

a first variable frequency driver which determines a first driving frequency based on the flicker value according to the grayscale value of the first area and generates a first data signal of the first driving frequency when the first area data represents a still image; and a second variable frequency driver which determines a second driving frequency based on the flicker value according to the grayscale value of the second area and generates a second data signal of the second driving frequency when the second area data represents a still image.

3. The display apparatus of claim 2, wherein the first variable frequency driver comprises:

a first still image determiner which determines whether the first area data represent the still image or a video image, and which generates a first flag representing whether the first area data represent the still image or the video image;

a first flicker value storage which stores the flicker value according to the grayscale value of the first area data;

a first driving frequency determiner which determines a driving mode of the first area data among one of a normal driving mode and a low frequency driving mode based on the first flag and which determines the first driving frequency of the first area data using the first flicker value storage; and a first compensation frame inserter which inserts a first compensation frame between a frame of a first frequency and a frame of a second frequency when the first driving frequency is changed from the first frequency to the second frequency by the first driving frequency determiner.

4. The display apparatus of claim 3, wherein the first area data comprises a plurality of segments, and wherein the first variable frequency driver determines the first driving frequency of the first area data based on optimal driving frequencies for the plurality of segments of the first area data.

5. The display apparatus of claim 3, wherein the second variable frequency driver comprises:

a second still image determiner which determines whether the second area data represent a still image or a video image, and which generates a second flag representing whether the second area data represent the still image or the video image;

a second flicker value storage which stores the flicker value according to the grayscale value of the second area data;

a second driving frequency determiner which determines a driving mode of the second area data among one of the normal driving mode and the low frequency driving mode based on the second flag and which determines the second driving frequency of the second area data using the second flicker value storage; and a second compensation frame inserter which inserts a second compensation frame between a frame of a third frequency and a frame of a fourth frequency when the second driving frequency is changed from the third frequency to the fourth frequency by the second driving frequency determiner.

6. The display apparatus of claim 5, wherein the second area data comprises a plurality of segments, and wherein the second variable frequency driver determines the second driving frequency of the second area data based on optimal driving frequencies for the plurality of segments of the second area data.

7. The display apparatus of claim 5, wherein the first flicker value storage is same as the second flicker value storage.

8. The display apparatus of claim 2, wherein the area divider divides an input data enable signal corresponding to the input image data into a first data enable signal corresponding to the first area data and a second data enable signal corresponding to the second area data and generates the first data enable signal and the second data enable signal, wherein the first variable frequency driver generates the first data signal having the first driving frequency using the first data enable signal, wherein the second variable frequency driver generates the second data signal having the second driving frequency using the second data enable signal, and wherein the driving controller generates an integrated data signal by an OR operation of the first data signal and the second data signal.

9. The display apparatus of claim 8, wherein the gate driver outputs a first gate signal group corresponding to the first area data and a second gate signal group corresponding to the second area data, and wherein the gate driver inactivates an output of at least one of the first gate signal group and the second gate signal group based on the first driving frequency and the second driving frequency.

10. The display apparatus of claim 2, wherein the area divider divides the input image data into the first area data, the second area data and third area data, wherein the driving controller further comprises a third variable frequency driver which determines a third driving frequency of the third area data based on a flicker value according to a grayscale value of the third area data.

11. The display apparatus of claim 1, wherein the driving controller includes a single flicker value storage corresponding to the plurality of display areas.

12. The display apparatus of claim 1, wherein the driving controller generates a plurality of respective data signals corresponding to the plurality of display areas respectively, wherein the driving controller generates an integrated data signal by an OR operation of the plurality of respective data signals.

13. A display apparatus comprising:

a display panel which comprises a gate line and a data line, and displays an image based on input image data, the display panel including a plurality of display areas;

a gate driver which outputs a gate signal to the gate line; and a driving controller which determines respective gate driving frequencies of the plurality of display areas of the display panel based on flicker values according to grayscale values of the display areas, wherein the display areas are disposed in a direction of a scanning direction of the gate signal.

14. A display apparatus comprising:

a display panel which comprises a gate line and a data line, and displays an image based on input image data, the display panel including a plurality of display areas;

a gate driver which outputs a gate signal to the gate line; and a driving controller which determines respective gate driving frequencies of the plurality of display areas of the display panel based on flicker values according to grayscale values of the display areas, wherein the driving controller includes a plurality of flicker value storages corresponding to the plurality of display areas respectively.

* * * * *